(12) United States Patent
Zhuang et al.

(10) Patent No.: US 9,270,624 B2
(45) Date of Patent: Feb. 23, 2016

(54) CLOUD MESSAGING SERVICES OPTIMIZATION THROUGH ADAPTIVE MESSAGE COMPRESSION

(71) Applicant: Oracle International Corporation, Redwood City, CA (US)

(72) Inventors: Zhenyun Zhuang, Belmont, CA (US); Yao-Min Chen, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 355 days.

(21) Appl. No.: 13/891,981

(22) Filed: May 10, 2013

(65) Prior Publication Data
US 2014/0337442 A1    Nov. 13, 2014

(51) Int. Cl.
G06F 15/16    (2006.01)
H04L 12/58    (2006.01)
H04L 29/06    (2006.01)

(52) U.S. Cl.
CPC .............. *H04L 51/06* (2013.01); *H04L 51/066* (2013.01); *H04L 69/04* (2013.01)

(58) Field of Classification Search
CPC ................................ H04L 51/06; H04L 69/04
USPC .................................................. 709/206, 247
See application file for complete search history.

(56) References Cited

U.S. PATENT DOCUMENTS

2010/0115135 A1*  5/2010  Zhou et al. ................. 709/247
2014/0245326 A1*  8/2014  Kruglick ..................... 719/314

* cited by examiner

*Primary Examiner* — Hitesh Patel
*Assistant Examiner* — Joseph Maniwang
(74) *Attorney, Agent, or Firm* — Marsh Fischmann & Breyfogle LLP; Jonathon A. Szumny

(57) ABSTRACT

Intelligent adjustment of compression levels of messages being brokered or otherwise handled by message service providers in a cloud-computing environment to strike a balance between the reduction in network usage and storage requirement resources owing to message compression on one hand and the increase in CPU resource usage owing to message compression on the other hand for reducing usage-based charges from the cloud customer's point of view and reducing the equipment and operational cost from the cloud provider's point of view (resulting in the ability of the provider to take on and/or retain customers). Determination of an "optimal" compression level that strikes an appropriate balance among resource usage may include consideration of a current messaging load (e.g., bytes of data per unit time), a current compression level, and current usage levels of one or more of the various resources.

17 Claims, 6 Drawing Sheets

CLOUD MESSAGING SERVICES OPTIMIZATION THROUGH ADAPTIVE MESSAGE COMPRESSION

BACKGROUND

1. Field of the Invention

The present invention generally relates to cloud messaging services and, more particularly, to manners of adaptively and dynamically determining optimal levels and/or manners of compression of cloud-based messages to reduce overall resource usage (e.g., CPU, network bandwidth, persistent storage usage) to limit customer costs while maintaining quality of service (QoS) to meet related service level agreements (SLAs).

2. Relevant Background

Message-oriented Middleware (MOM) and related services are critical in distributed systems such as in business applications. Generally, MOM enables distributed applications to conveniently send and receive messages among each other to significantly simplify the design of complex business applications. For instance, MOM allows application modules to be distributed over heterogeneous platforms and reduces the complexity of developing applications that span multiple operating systems and network protocols. MOM can provide software elements that reside in all communicating components of a client/server architecture and typically supports asynchronous calls between the client and server applications. Furthermore, MOM can reduce the involvement of application developers with the complexity of the master-slave nature of the client/server mechanism.

MOM is increasingly being deployed in the context of cloud computing (e.g., in "the cloud"), namely, where computing resources (e.g., hardware, software) are delivered as services over one or more networks (e.g., the Internet). Cloud computing often entrusts remote services with a user's data, software and computation. For instance, end users may access cloud-based applications through a web browser or the like (e.g., light-weight desktop client or mobile app) while the business software and user's data are stored on servers at one or more remote locations. Cloud computing can allow companies to limit upfront infrastructure costs, get their applications up and running faster with improved manageability and less maintenance, and enable their information technology (IT) personnel to more rapidly adjust resources to meet fluctuating and unpredictable business demand.

FIG. 1 presents a simplified illustration of how MOM may be implemented in a cloud-based computing environment 10. Generally, the environment 10 may include at least one "cloud" 14 (e.g., interconnected collection of infrastructure, applications, storage, processing, other services, etc.) that may be accessed and utilized by a plurality of customers or clients (e.g., desktop or laptop computers, servers, thin clients, smartphones, tablets, other mobile devices, etc.) for use of the cloud services through applications such as web browsers, web-based interfaces, application programming interfaces (API), or the like. As an example in one arrangement, the client applications may include a message producer 18 and a message recipient or consumer 22. The message producer 18 may be configured to produce and send a message (e.g., Java® message) over one or more networks (e.g., the Internet) to a message service provider 26 (e.g., Oracle's WebLogic® and GlassFish® servers or other cloud-deployed MOM providers) in the cloud 14, where the message consumer 22 is configured to appropriately retrieve the message from the message service provider 26.

In a "point-to-point" mode of MOM, for instance, a first customer (e.g., a first hospital or doctor's office) may need to send medical imaging data or the like to a second customer (e.g., another hospital or doctor's office). In this regard, a client application (the message producer 18) of the first customer may serve to encapsulate the medical image data in a message and then transmit the message to the message service provider 26 which queues, stores (e.g., in volatile memory, not shown) and backs up (e.g., in persistent or non-volatile storage 30) the message for retrieval by a client application (the message consumer 22) of the second customer. In a "publish-and-subscribe" mode of MOM, the message producer 18 may be a publisher that publishes a topic for retrieval by a plurality of message consumers 22 (e.g., which may be equated to the publisher multicasting messages to multiple consumers). In any event, each message consumer 22 may appropriately register with the message service provider 26 to receive callbacks from the message service provider 26 upon messages for the message consumer 22 being queued at the message service provider 26. In this regard, the message service provider 26 acts as a broker between the message producer 18 and message consumer 22 by ensuring the security and integrity of transactions by way of persistent storage.

Cloud-based messaging services may be aggregated for large numbers of message producers and consumers 18, 22 (e.g., client applications) and the cost may be amortized and shared by the various customers. In such a cloud deployment, the more resources that a client application uses, the higher are the costs that will be incurred. Some cloud services (e.g., Infrastructure as a Service (IaaS), Platform as a Service (PaaS)) dynamically allocate (e.g., add or remove) resources based on customers' actual load. For instance, if the message service provider's 26 loading (e.g., utilization) is higher, more CPUs may need to be allocated to maintain QoS (e.g., response time) to meet a particular SLA. On the other hand, CPUs may be freed in response to reduced work load. Other resources such as persistent storage and network bandwidth may be similarly dynamically allocated. The resulting charges (from a cloud customer's view) and the cost (from the cloud provider's view) may be based on the actual resource usage.

SUMMARY

Current cloud-based messaging service providers (e.g., Amazon®) charge customers based on the usage of at least three types of resources: the CPU usage, networking usage and storage usage. On one hand, it is in the customers' interest to minimize or at least reduce the aggregated (e.g., overall, collective) cost of different resource usage. On the other hand, identifying the most efficient operational point in terms of the cost to provision the resources helps messaging service providers to sign up more customers. In this regard, disclosed herein are systems, method and other utilities that make use of one or more types of message compression at one or more various dynamic compression levels as a mechanism to balance cloud-based messaging resources for purposes of reducing cloud customers' charges and increasing the ability of cloud providers to take on and/or retain customers. Generally, message compression reduces network usage and storage requirements for message service providers (e.g., upon receiving messages from message producers and storing such messages in persistent storage, such as for purposes of backup), as doing so reduced message size. However, doing so consumes more CPU cycles (e.g., threads) as well as server RAM resources of the message service provider than in the absence of message compression.

Accordingly, the utilities disclosed herein serve to intelligently adjust compression levels of messages being brokered or otherwise handled by message service providers so as to strike a balance between the reduction in network usage and storage requirement resources owing to message compression on one hand and the increase in CPU resource usage owing to message compression on the other hand. The disclosed intelligent compression level adjustment utilities reduce usage-based charges from the cloud customer's point of view and reduce the equipment and operational cost from the cloud provider's point of view (resulting in the ability of the provider to take on and/or retain customers). As will be discussed in more detail herein, determination of an "optimal" compression level that strikes an appropriate balance among resource usage may include consideration of a current messaging load (e.g., bytes of data per unit time), a current compression level, and current usage levels of one or more of the various resources. For instance, the current CPU usage level (e.g., percentage usage of all CPU capacity, number of strands, cycles or threads being consumed, etc.), current network bandwidth usage level (e.g., bytes of data per unit time), and persistent storage usage level (e.g., percentage usage) may be determined. In one arrangement, the network bandwidth and persistent storage usage levels may be collectively determined and analyzed as a single resource (e.g., an input/output (I/O) resource).

In one aspect, a method of adaptively or dynamically determining messaging compression levels designed to reduce overall resource costs in a cloud-based messaging environment includes determining or collecting data representing a current messaging state, such as a current messaging load (e.g., bytes of data per unit time), a current compression level, and current usage levels of one or more of the various resources (e.g., CPU, network bandwidth, storage). The method also includes estimating or predicting resource usage levels at other compression levels at the current messaging load based on the current and/or past (e.g., known, historical) monitored data points. After obtaining historical data points (e.g., resource levels) corresponding to various pairs of message loads and compression levels, for instance, the resource usage levels of one or more specific pairs of messaging loads and compression levels can be predicted by performing linear regression. For instance, each resource usage level may be a function of the messaging load and compression level.

Once the resource usage levels under various different compression levels for the current messaging load have been predicted, the compression levels resulting in a desired overall resource usage level, such as a reduced or minimized overall resource usage level, may be selected and/or outputted and then messages may be compressed at the particular compression level. For example, the method may include scanning all possible compression level values and associated known or predicted resource usage levels to determine an optimal compression level value. Periodically (e.g., every time "t"), the method may be rerun (e.g., as an iterative loop) and the implemented compression level may dynamically adjusted as necessary. As increased quantities of data points are collected, the method may be operable to more accurately predict resource usage levels at various compression levels and messaging loads and identify optimal compression levels for implementation.

In one arrangement, all messages may be compressed (e.g., by the message service provider) to a particular level such as using one of gzip, LZF, WinZip, and/or other compression algorithms or techniques. As an example, some compression techniques may have several modes where one of these modes (e.g., a "speed mode") may generally compress less (e.g., to a higher compression ratio) and utilize lower levels of CPU resources while another of these modes (e.g., a "compression ratio mode") may generally compress more (e.g., to a lower compression ratio) and utilize higher levels of CPU resources. For instance, each of the various modes can be run and the particular compression ratios coming out of the mode can be observed and recorded. The actual compression ration may depend upon the mode that was selected, the content of the message (text, binary data, image, etc), and the like. In any case, the compression technique resulting in the closest desired compression ratio or level may be selected and implemented. As another example, other compression techniques allow for more fine grained control of compression levels.

In another arrangement, a particular portion (e.g., percentage) of all messages may be compressed to one or more appropriate compression levels, such as by compressing a all of a particular portion of the messages using the "speed mode" or some other mode of a particular compression technique. That is, controlling the particular portion of messages to be compressed effectively allows for control of the determined compression level. Intelligently implementing optimal compression levels as disclosed herein may incorporate either or both of the preceding arrangements.

In one variation, different compression techniques (e.g., gzip, LZF, WinZip, and/or the like) may be utilized for different compression levels. For instance, the various resources levels may be estimated based on pairs of compression levels and messaging loads under various different compression techniques. In this regard, selection of the optimal compression level may include using different compression techniques under various different sets of data points. In another variation, the various known data points may be weighted in accordance with how close the parameters of such data points (e.g., the messaging loads and compression levels) are to those parameters of a particular data point or points to be predicted. For instance, when estimating the CPU usage level at a messaging load of 5 kb/sec and a compression level of 23%, the known CPU usage level at a messaging load of 5 kb/sec and a compression level of 22% may be weighted more heavily (e.g., afforded greater importance in the estimation) than the known CPU usage level at a messaging load of 15 kb/sec and a compression level of 50%.

In another aspect, an adaptive message compression system for a message service provider in a cloud-computing environment includes a queue that stores messages received from a message producer over at least one network for retrieval by a message consumer over at least one network; a compression engine that compresses the copies of the queued messages at one or more compression levels, where the compressed message copies are transmitted to a storage server over at least one network for storage, and where compression and transmission of the of the queued message copies to the storage server consumes processing, network bandwidth and storage resources of the adaptive message compression system; and an analysis module that determines at least one particular compression level that reduces costs associated with consumption of the processing, network bandwidth and storage resources of the adaptive message compression system, where the particular compression level is implemented by the compression module.

In a further aspect, a cloud-based computing system includes a processing module and a memory module logically connected to the processing module and including a set of computer readable instructions executable by the processing module to receive messages from message producers over one or more networks at one or more messaging loads; store the messages in the memory module so that the messages may be retrieved by message consumers over one or more networks; determine at least one particular compression level at which to compress copies of the messages to be sent for storage on a network-based storage server, where the particular compression level is a compression level that reduces costs associated with consumption of processing, network bandwidth and storage resources of the system in conjunction with compression and storage of messages; compress copies of the stored messages at the particular compression level; and send the compressed message copies to a network-based storage server for storage.

In addition to the exemplary aspects and embodiments described above, further aspects and embodiments will become apparent by reference to the drawings and by study of the following descriptions.

DETAILED DESCRIPTION

The present disclosure is generally directed to the dynamic, intelligent adjustment of compression levels of messages (e.g., Java® messages) being received at a message service broker or provider (e.g., running middleware such as MOM), queued and compressed for storage on a network-based storage server (e.g. to backup for purposes of a persistent mode of operation), where the queued messages are available for retrieval by the message consumer for which the messages are intended. Specifically, the particular compression level being applied to incoming messages is determined and selected to minimize or at least reduce overall resource consumption costs associated with compression and storage of incoming messages. For instance, statistics may be periodically collected over time in relation to messaging loads, compression levels, and resource usages levels, such historical data may be used to predict resources usage levels for a plurality of different compression levels, and then the compression level associated with a reduced (e.g., lowest) overall resource usage level and/or cost at a current messaging load may be selected for implementation. The determined "optimal" compression level serves to reduce usage-based charges from the cloud customer's point of view and reduce the equipment and operational cost from the cloud provider's point of view (resulting in the ability of the provider to take on and/or retain customers).

Figure 1:
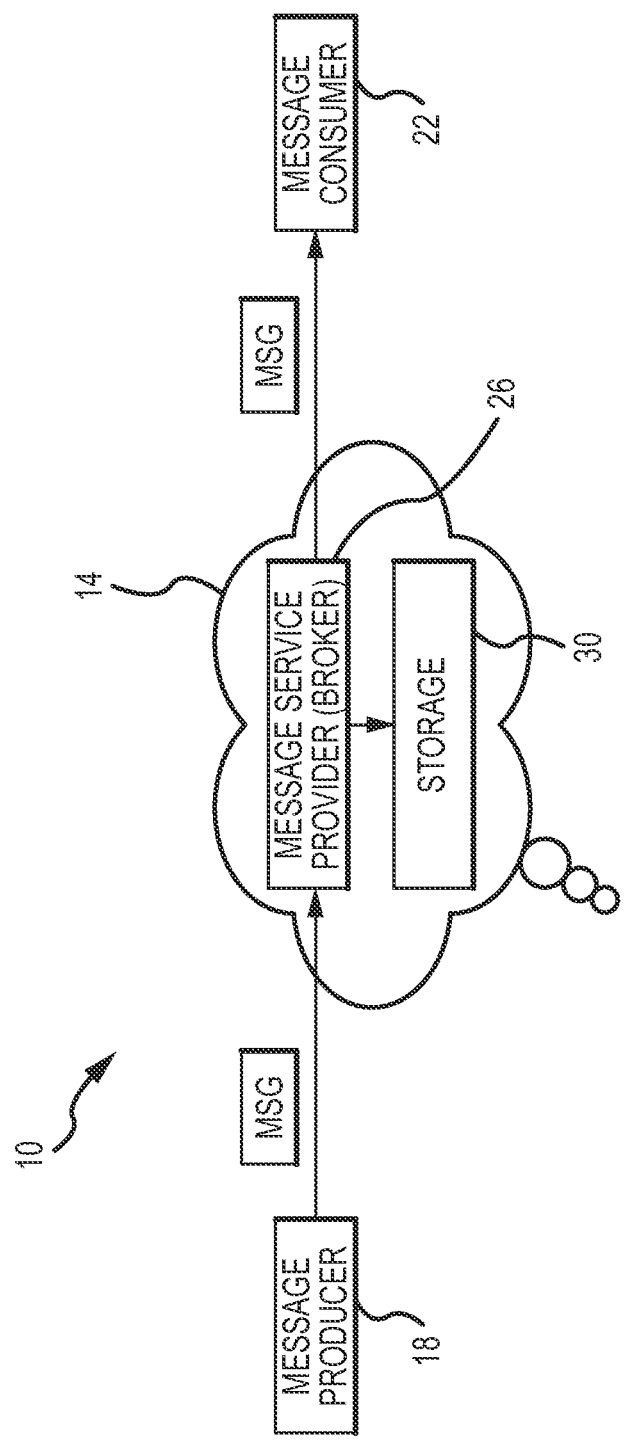
FIG. 1 is a simplified illustration of how MOM may be implemented in a cloud-based computing environment, according to the prior art.
Figure 2:
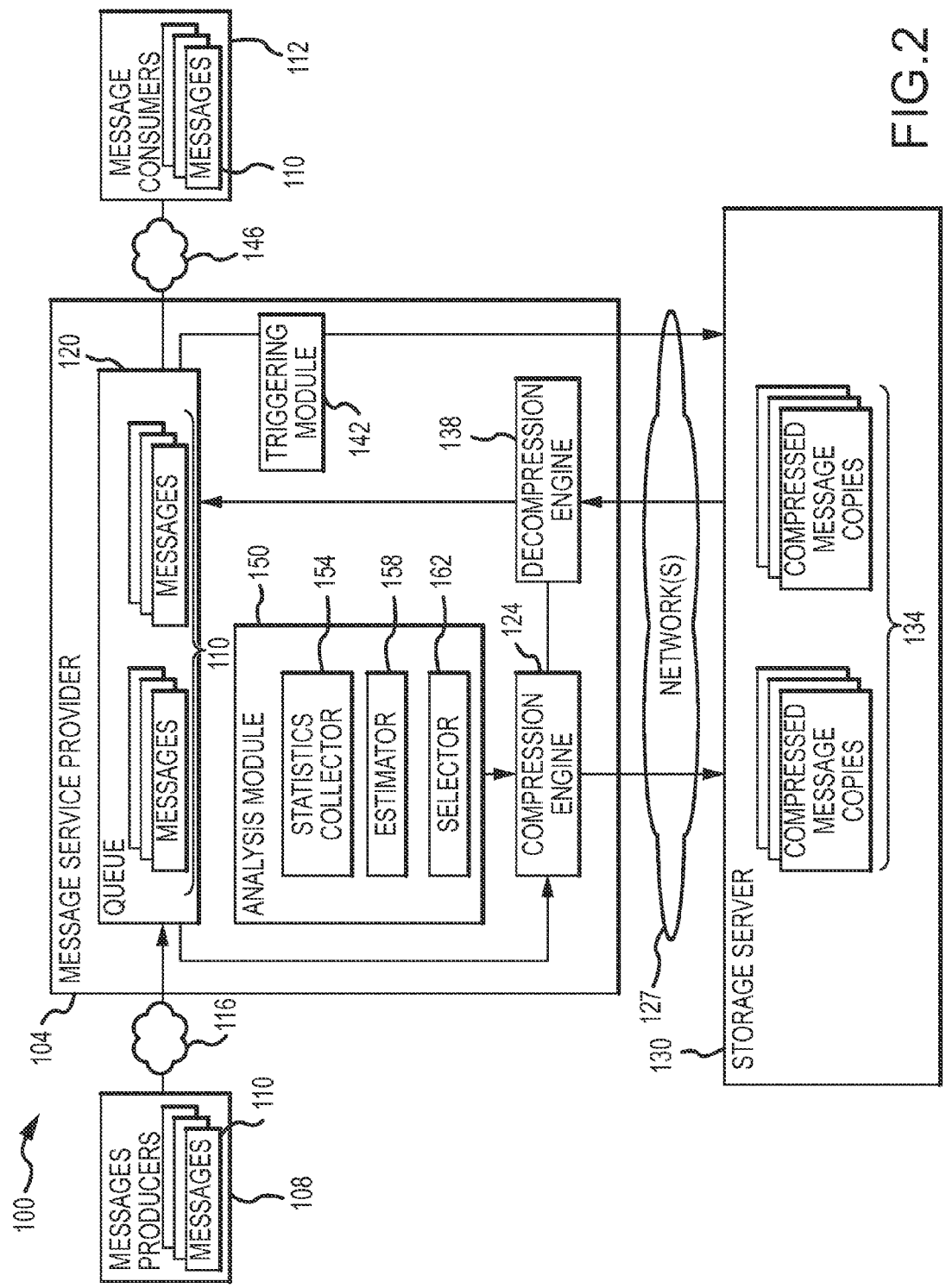
FIG. 2 is a block diagram of a cloud-based messaging environment that intelligently compresses messages at one or more compression levels before transmission to a network-based storage server to reduce overall resource usage levels, according to one embodiment.

FIG. 2 is a functional block diagram of a cloud-based messaging environment 100 that implements the adaptive message compression techniques disclosed herein. At the heart of the environment may be a cloud-based message service broker or provider 104 (e.g., one or more cloud-based servers or other computing devices) implementing any appropriate MOM to facilitate the brokering or transfer of messages from message producers 108 (e.g., client applications implemented on devices such as servers, laptops, smartphones, etc.) to message consumers 112 (e.g., client applications implemented on devices such as servers, laptops, smartphones, etc.) as well as the disclosed adaptive message compression techniques. More specifically, the message producers 108 may be configured to produce and send messages over one or more networks 116 (e.g., the Internet) to the message service provider 104 based in a cloud (not shown) which stores and makes the messages available for retrieval by the intended and/or corresponding message consumers 112. While not shown, the message service provider 104 may include any appropriate arrangement of volatile memory (e.g., one or more memory or RAM modules), processing (e.g., one or more CPUs or processor cores), non-volatile storage (e.g., magnetic, optical, solid state, etc.), among other components (e.g., I/O devices, network interfaces, and the like), all of which may be appropriately interconnected by one or more busses. For instance, the MOM of the message service provider 104 may be stored on the volatile and/or non-volatile memory and executed by the processing arrangement.

Figure 4:
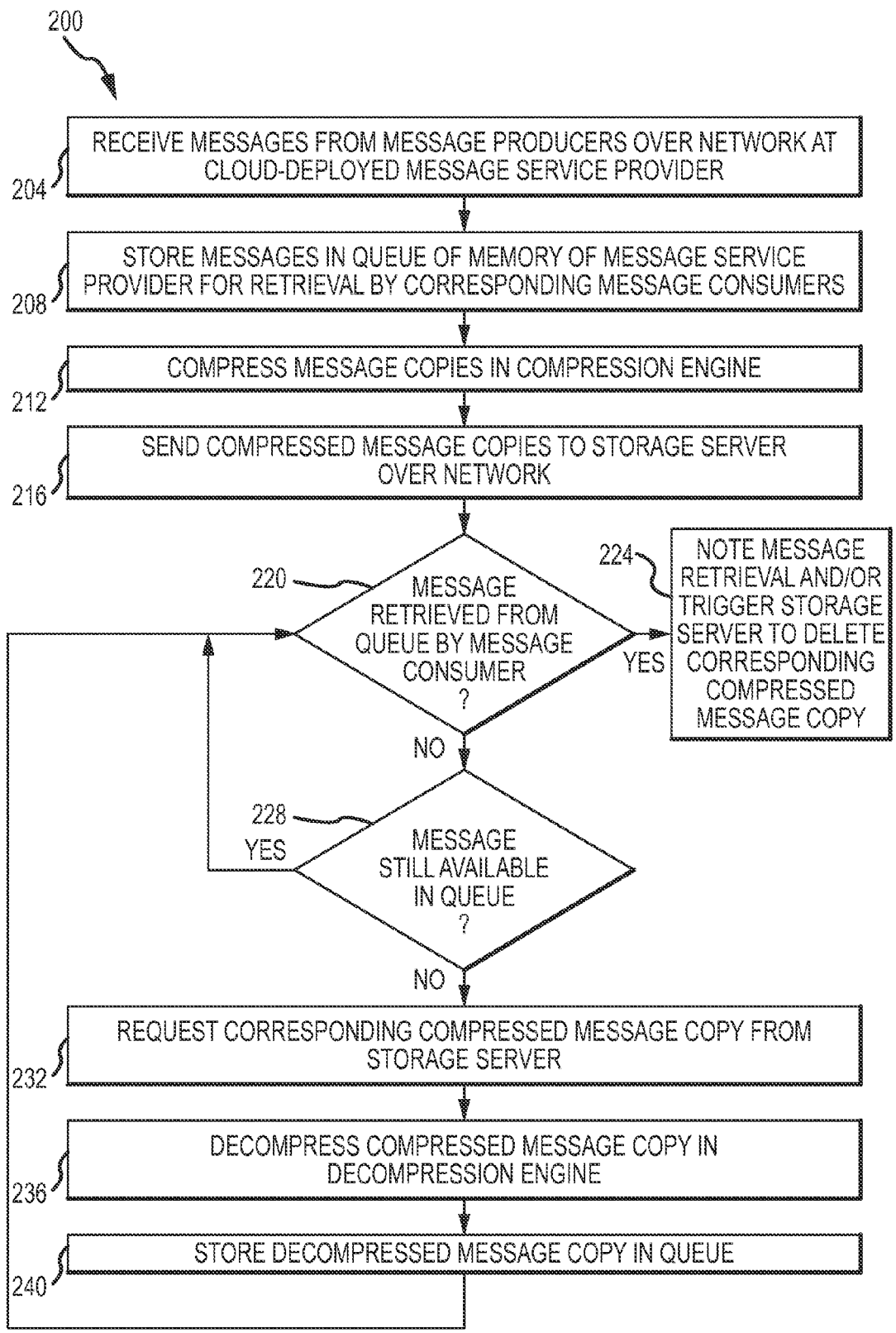
FIG. 4 is a flow diagram of a method of receiving, storing, compressing and transmitting messages to a storage server for use with the environment of FIG. 2.

With additional reference now to FIG. 4, a flow diagram of a method 200 of receiving messages at a message service provider (e.g., message service provider 104) and making the same available for message consumers is presented. At 204, messages (e.g., Java® messages incorporating any appropriate data, such as medical imaging data, banking data, etc.) from message producers (message producers 108) may be received at the message service provider over one or more networks 116 (e.g., Internet, WAN, LAN). For instance, the message producers 108 may generate and send messages 110 to the message service provider 104 by way of a guaranteed channel incorporating 10 G Ethernet, InfiniBand (IB), and/or other future advanced networking infrastructure technologies. Upon receipt of the messages 110 at the message service provider 104, the messages 110 may be stored 208 in a queue 120 of a memory (e.g., RAM) of the message service provider 104 in any appropriate format or manner so that the messages 110 may be retrieved by message consumers 112 over one or more networks 146 (e.g. Internet, WAN, LAN, etc., such as over one or more guaranteed channels). In one arrangement, a different queue 120 may be provided for messages 110 intended for each respective message consumer 112 (e.g., in a "point-to-point" mode). In another arrangement, a different queue 120 may be provided for each particular topic in a "publish-and-subscribe" mode, where each of those message consumers 112 that have subscribed to the particular topic may obtain messages from the queue 120.

The messages consumers 112 may obtain messages 110 from one or more queues 120 in any appropriate manner. In synchronous (e.g., blocking) mode, for instance, a message consumer 112 can call "recv( )" and then the message server provider 104 may send any messages stored for the message consumer 112 to the message consumer 112. In one arrangement, a time-out value (e.g., 20 seconds) may be established so that if the message service provider 104 does not send any messages to the message consumer 112 after the particular time-out value, the message service provider 104 may pass control back to the message consumer 112 and the blocking that occurs while the message consumer 112 is waiting for messages ends. In asynchronous (e.g., non-blocking) mode, for instance, the message service provider 104 may push messages to the message consumers 112 upon messages being ready for the message consumers 112. In this case, the message consumers 112 may need to register callbacks to the broker.

To provide for persistent storage of the messages 110 in the case of loss of power, corruption, server failure, and/or the like, the message service provider 104 may back up the messages 110 received and queued from the message producers 108 in any appropriate non-volatile storage arrangement. In one arrangement, the message service provider 104 may store copies of the messages 110 in one or more local, non-volatile storage drives or mechanisms (e.g., magnetic, optical, solid state, etc.). In another arrangement, the message service provider 104 may send the messages 110 or copies thereof to any appropriate storage server 130 (e.g., incorporated within a storage library, distributed computing system, etc.) over one or more networks 127 (e.g., Internet, WAN, LAN, etc.).

In either case, it may be advantageous to compress the copies of the messages 110 before storing the same on the non-volatile storage arrangement to reduce bandwidth utilization over the one or more networks 127 and reduce storage space consumed on the storage server 130. For instance, the method 200 may include compressing 212 copies of the messages 110 in a compression engine 124 of the message service provider 104 and then sending 216 the compressed message copies 134 for storage on the storage server 130. The method 200 may then query 220 (e.g., by triggering module 142 of message service provider 104) whether one or more messages 110 have been retrieved from the queue 120 by one or more corresponding message consumers 110. In response to a positive response to the query 220, the method 200 may, in one arrangement, note 224 or record in a local memory of the message service provider 104 that the one or more messages 110 have been retrieved by a corresponding message consumer 112.

For instance, in the event that respective metadata for each of the messages 110 is maintained in the local memory of the message service provider 104, the message service provider 104 (e.g., by triggering module 142 of message service provider 104) may mark a bit of the respective metadata for the one or more retrieved messages 110 to record the fact that the messages 110 have been retrieved. In another arrangement, the method 200 may, in response to a positive response to the query 220, trigger 224 (e.g., by triggering module 142 of message service provider 104) the storage server to delete the corresponding one or more compressed message copies 134 from the storage server 130. In a still further arrangement, a house-keeping function of the storage server 130 may delete the message copies 134 after any appropriate period of time that such message copies 134 have been present in the storage server 130.

In response to a negative response to the query 220, the method 200 may then query 228 whether the message 110 is still available in the queue 120. In response to a positive answer to the query 228, the method may 200 may again query 220 whether the message 110 has been retrieved from the queue 120 by one or more corresponding message consumers 112. In one arrangement, the queue 120 or other module of the message service provider 104 may sense that a message 110 has been retrieved from the queue 120 and then alert the triggering module 142 to trigger the storage server 130 to delete the corresponding compressed message copy 134 therefrom.

In any event, a negative response to the query 228 may cause the method 200 to proceed to request 232 (e.g., via any appropriate module of the message service provider 104) the corresponding compressed message copy 134 of the message 110 from the storage server 130 over the one or more networks 127. For instance, in the case where a message consumer 112 dies and restarts, there may be backlog accumulated in the queue 120 which eventually leads to purging of the messages 110 from the queue 120. In this case, the corresponding compressed message copies 134 may be retrieved from the storage server 130. The compressed message copies 134 may then be decompressed 236 in a decompression engine 138 and stored 240 in the queue 120 (e.g., in place of the original message 110) for retrieval by one or more corresponding message consumers 112.

In one arrangement, the decompression engine 138 may be part of or separate from but in communication with the compression engine 124 (e.g., as indicated by the line connecting compression engine 124 and decompression engine 138 in FIG. 2) for purposes of obtaining the particular compression algorithm used to be able to decompress the messages. In another arrangement, the decompression engine 138 may be separate from and not in communication with the compression engine 124. In the latter case, each of the compressed message copies 134 may include metadata storing information regarding the particular compression algorithm. The method 200 may eventually flow to 220 to again query whether one or more messages 110 (e.g., or decompressed message copies) have been retrieved from the queue 120 by one or more corresponding message consumers 110.

While compressing the copies of the messages 110 before transmission to the storage server 130 advantageously reduces or limits network bandwidth consumption (e.g., in bytes per second) and storage server 130 consumption (e.g., in bytes), doing so can also increase the number of CPU cycles (e.g., strands, threads) of the message service provider 104 that must be allocated to accommodate the increased processing demand to compress the messages. In this regard, the message service provider 104 may include or at least have access to an analysis module 150 that is configured to intelligently determine one or more particular "optimal" compression levels and/or compression techniques to be implemented by the compression engine 124 that minimize or at least reduce overall resource (e.g., CPU, network bandwidth, storage) consumption by the environment 100 in conjunction with the compression of copies of messages 110, transmission of such compressed message copies 134, and storage of such compressed message copies 134. More specifically, the analysis module 150 serves to determine one or more particular compression levels and/or compression techniques that strike a balance between the reduced network bandwidth and storage space consumed by the compressed message copies 134 (i.e., as opposed to uncompressed message copies) versus any increase in CPU cycles consumed owing to such compression.

Broadly, the analysis module 150 may include a statistics collector 154 that determines or at least collects statistics related to the collection, compression and storage of messages 110 in conjunction with the cloud-based messaging service, an estimator 158 that estimates or predicts resources usage levels of CPU cycles, network bandwidth, and storage space at various different compression levels and/or compression techniques, and a selector 162 that selects or chooses one or more particular compression levels and/or compression techniques corresponding to a lowest or at least reduced overall resources usage consumption and sends such selected compression level(s) and/or compression technique(s) to the compression engine 124 (e.g., and in some arrangements the decompression engine 138) for implementation (i.e., for compression of messages 110 at the selected compression level(s) and/or using the selected compression technique(s), such as at step 212 of the method 200 of FIG. 4).

Figure 5:
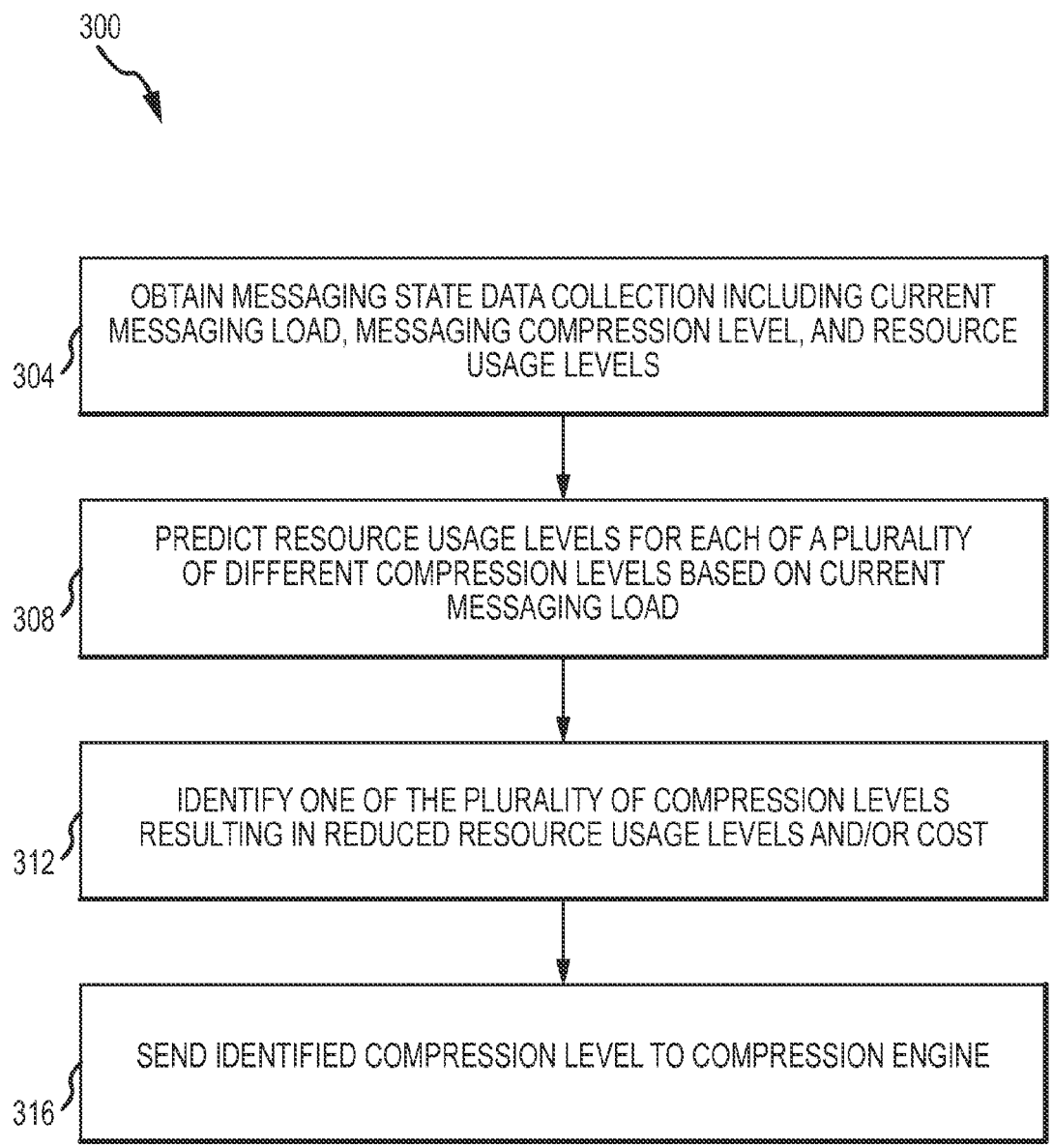
FIG. 5 is a flow diagram of a method of intelligently determining optimal compression levels of incoming messages for use with the environment of FIG. 2.

Turning now to FIG. 5, a flow diagram of a method 300 of intelligently determining optimal compression levels and/or compression techniques for use in compressing incoming messages is presented. In conjunction with the following discussion of the method 300, reference will also be made to FIG. 3 which presents a more detailed block diagram of the analysis module 150 of FIG. 2. At 304 in FIG. 5, a messaging state data collection $166_1$ may be obtained that represents a current messaging state of the messaging environment 100. For instance, the messaging state data collection $166_1$ may include a known message load 168 (e.g., the set of messages being processed by the message service provider 104, such as in messages or thousands of messages per unit time (e.g., second), or some normalized value within a range (e.g., [0,100])), a known compression level 170 (e.g., a particular portion of each message being compressed, such as 30%; a particular percentage of all messages being compressed, such as 30% or 50% of all messages, where a particular portion of each of such messages is compressed, such as 20%, 30%, etc.; and/or the like), and known resource usage levels 172 (e.g., number of CPU threads being consumed for compression of each message, network bandwidth consumption in MB/sec, storage space consumed, etc.), where all of such "known" data is with respect to a time at which such data is collected and/or recorded.

For instance, MOM typically has built-in functions to collect load statistics (e.g., number of messages per second), such as on every messaging queue, where the statistics collector 154 may include simple scripts to query for such statistics. As another example, load statistics may be collected at networking layers. As another example, resource usage level statistics (e.g., CPU, networking, storage) may be obtained by executing a range of utilities (e.g., operating system utilities, such as Solaris and/or Linux utilities) such as mpstat (for CPU), netstat (for Networking), and iostat (for storage I/O rate). In one arrangement, the obtaining 304 may be configured to execute after any appropriate time period, such as after every "t" seconds, minutes, etc. As shown in FIG. 5, the current messaging state data collection $166_1$ may be appropriately obtained and recorded and added to previous message state data collections $166_2$-$166_n$ collected over time. The collected statistics may be stored in any appropriate location (s) easily accessible by the analysis module 150 (e.g., by the estimator 158). For instance, the collected statistics may be stored on the same host as the analysis module 150, in any appropriate persistent storage (e.g., database) to allow for recovery after machine failure, and/or the like.

In one arrangement, the obtaining 304 may include performing a "record" routine whereby each messaging state data collection 166 is added to a vector of records (where each record represents a respective messaging state data collection 166). For instance, the values of each messaging state data collection 166 could be combined into a element of a Java® class record defined as:

```
Class Record {
    Date time;
    Integer L;
    Integer d;
    Integer Uc;
    Integer Us
```

-continued

```
};
``` where "L" is a current messaging load, "d" is a current compression level, "Uc" is a current CPU usage, and "Us" is a current "I/O" usage (where "current" is relative to the particular time the data is recorded or otherwise obtained).

That is, network bandwidth and storage space consumption may in some arrangements be combined into a single metric referred to as I/O usage to simplify the discussion and facilitate the reader's understanding of the present disclosure. In one arrangement, storage consumption can be considered for both space consumption (bytes) and bandwidth consumption (bytes/sec). In other arrangements, the network bandwidth and storage space consumption may be separately obtained and recorded and utilized as part of determining optimal compression levels and/or compression techniques to be implemented in the cloud-based messaging environment 100. In any case, all of the above elements may be organized into a vector of "RECORD[ ]". In one arrangement, the total number of records in the vector (i.e., the length of the vector) may be kept to a maximum value of "N." In another arrangement, only a most recent "N" of all records may be utilized as part of determining the optimal compression levels and/or compression techniques (e.g., to conserve memory, as more recent records are likely to be more relevant than older records, etc.). As an example, each record may be associated with a time stamp or the like indicating a relative time at which the record was created. For instance, only the top "N" most recent records (e.g., as determined by comparing the time stamps of the records to a current time) may be utilized as part of determining the optimal compression levels and/or compression techniques. Additionally or alternatively, all records associated with a time stamp within a certain period of time from a current time may be utilized.

Returning to FIG. 5, the method 300 may also include predicting 308, from the collected messaging state data collections 166, resource usage levels for each of a plurality of different messaging compression levels based on the current messaging load. That is, the current and previously collected (e.g., historical) messaging state data collections 166 (e.g., where some or all of such collections include "optimally" determined compression levels using the teachings disclosed herein) may be used to predict resource usage levels for various different compression levels (e.g., 10% and 20% more than, and 10% and 20% less than the current compression level) at the present messaging load. In one arrangement, it may be assumed that 1) for a fixed messaging load (L), the CPU resource usage levels scale approximately linearly with the compression level (d), (which may often be true given an upper bound on CPU usage level such as 90% CPU usage or the like); and that 2) for a fixed compression level (d), the I/O resource usage levels scale approximately linearly with the messaging load (L).

Figure 3:
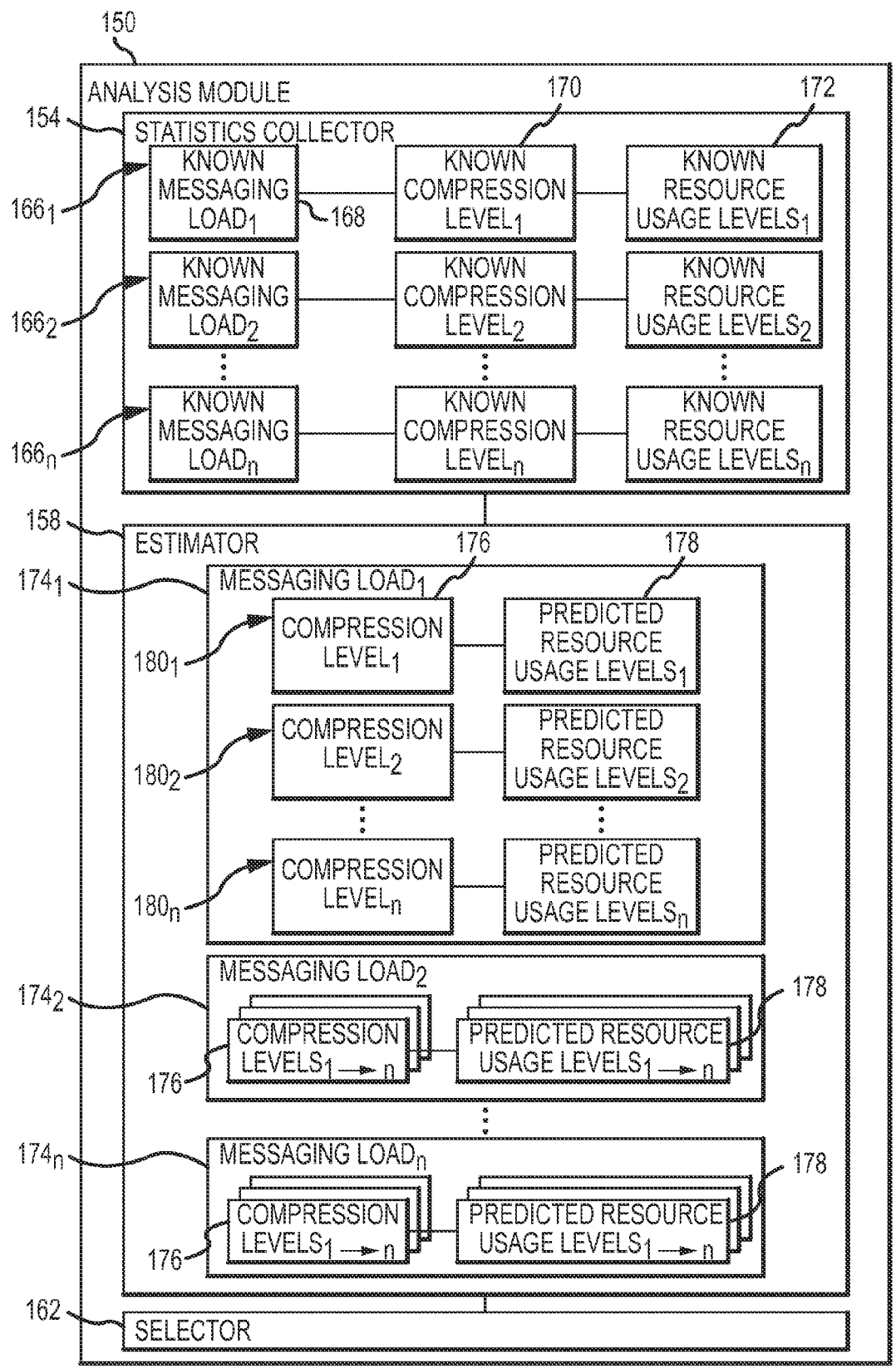
FIG. 3 is a more detailed block diagram of an analysis module of a message service provider of the environment of FIG. 2.

As an example, FIG. 3 illustrates how various resource usage levels 178 may be predicted for each of a number of different compression levels 176 for a first (e.g., current) messaging load $174_1$. For instance, for a first compression level 176 (e.g., "Compression Level$_1$," such as 10% more than the current compression level) at the first messaging load $174_1$, usage levels 178 for each of CPU, I/O, network bandwidth and/or storage space may be predicted in any appropriate manner. As another example, for a second compression level 176 (e.g., "Compression Level$_2$," such as 10% less than the current compression level) at the first messaging load $174_1$, usage levels 178 for CPU, I/O, network bandwidth and/or storage space may be predicted in any appropriate manner. In this regard, a plurality of data sets $180_{1-n}$ may be obtained for use in identifying one or more optimal compression levels and/or compression techniques as is discussed in more detail herein. In some arrangements, predicted resource usage data 178 may be obtained for one or more other messaging loads (e.g., $174_{2-n}$) for use as part of identifying optimal compression levels and/or techniques.

Figure 6:
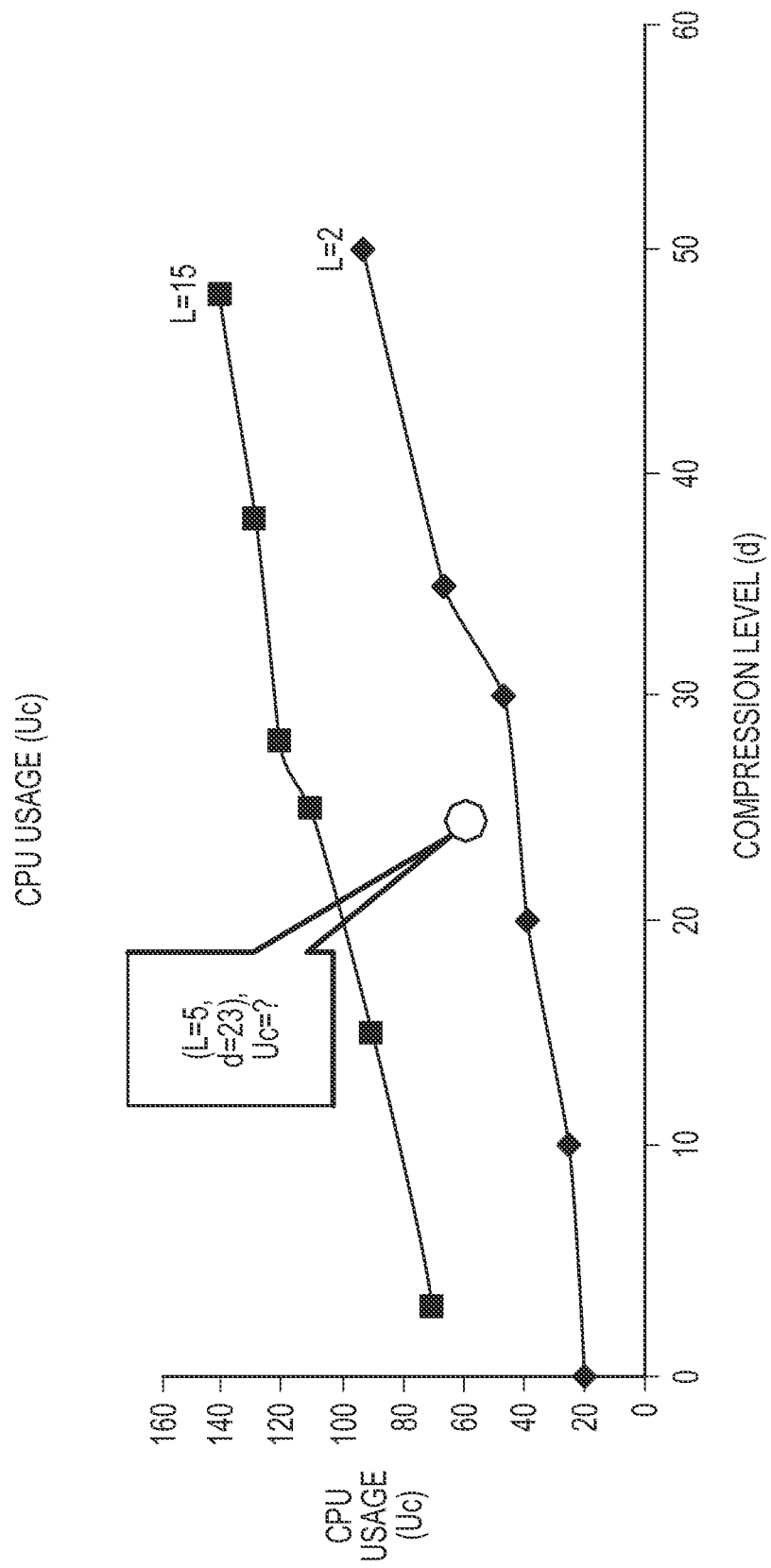
FIG. 6 is an example of a graph of CPU usage versus compression level for first and second different messaging loads.

To illustrate the prediction of CPU usage level (Uc(L,d)) for almost any combination of messaging load (L) and compression level (d), reference is now made to FIG. 6 which presents an example of a graph of CPU usage (e.g., in number of CPU threads) versus compression level (e.g., in percentage) for first and second different messaging loads (where the data used to prepare the graph in FIG. 6 may be obtained from the message state data collections 166 of FIG. 3). It is to be understood that while not shown, similar graphs of I/O usage versus compression level, network bandwidth versus compression level, storage I/O bandwidth and/or storage space versus compression level could also be similarly prepared and utilized as part of the resource usage level prediction process. Generally, each known data point in FIG. 6 (represented by the square-shaped marks) may contain Uc(L,d), where the data points of a common L may be connected by a line (e.g., curve). FIG. 6 illustrates two different lines corresponding to the corresponding pairs of CPU usage and compression level and two different respective L values (e.g., 15 and 2).

In this regard, the question then becomes how to determine or predict Uc for each of a plurality of arbitrary pairs of L,d, such as an L of 5 and a d of 23 as illustrated in FIG. 6 (e.g., in addition to Uc's for an L of 5 and d's of other values such as 10, 15, 30, 40, etc.). In one arrangement, the estimator 158 may predict Uc for a plurality of arbitrary pairs of L,d by performing linear regression, where all of the data points are modeled using linear predictor functions (e.g., y=ax+b), and where unknown parameters can be estimated by known data points. In this case, the two variables (L and d) result in a predictor function in the form of (Uc=Lx+dy+z) which can be fit using a least-squares approach.

Thus, a linear regression model may be used to obtain Uc(L,d) for a plurality of different d at a common L, where a least-squares fitting may be used to solve the linear regression model. For instance, for all of the known data points of Uc(L,d) (e.g., those shown in FIG. 6), $x_i$ may be the value of L, $y_i$ may be the value of d, and $z_i$ may be the corresponding Uc value to be predicted. Furthermore, "R" can be used to denote the sum of the least squares, where $R(a, b, c)=\Sigma(z_i-ax_i-by_i-c)^2$. In this case, the values of a, b and c can be obtained by minimizing the R(a,b,c) value and solving the system $\partial G/\partial a=0$, $\partial G/\partial b=0$, and $\partial G/\partial c=0$. As the system $\partial G/\partial a=0$, $\partial G/\partial b=0$, and $\partial G/\partial c=0$ is linear, it can be solved with matrices. Thus, the matrix equation for a, b, and c is:

$$\begin{bmatrix} \sum x_i^2 & \sum x_i y_i & \sum x_i \\ \sum x_i y_i & \sum y_i^2 & \sum y_i \\ \sum x_i & \sum y_i & n \end{bmatrix} \begin{bmatrix} a \\ b \\ c \end{bmatrix} = \begin{bmatrix} \sum x_i z_i \\ \sum y_i z_i \\ \sum z_i \end{bmatrix}$$

Once the values of a, b and c are obtained (e.g., whose complexity may scale linearly with the set size N of known data points (i.e., O(N)), the value of Uc(L,d) may be calculated for every d with Uc=aL+bd+c (e.g., whose complexity may be in the order of total number D of compression levels (i.e., O(D)). While not discussed in more detail, a linear regression model may also be similarly used to obtain Us(L, d) for a plurality of different d at a common L.

Once resource usage levels have been predicted 308, the method 300 of FIG. 5 may include identifying 312 at least one of the compression levels from the predicting 308 (e.g., an "optimal" level) that results in a lowest or at least reduced overall usage of the various resources under consideration (e.g., a reduced overall usage level of CPU usage, network bandwidth usage, and storage space usage). As cloud providers and consumers (e.g., message producers and message consumers) may have agreed on some sort of charging and/or pricing scheme for resource usage, one object may be to identify a compression level resulting in a minimum overall resource usage cost, where the resource usage cost is determined as a function of the resource usage level(s). In one arrangement, the optimal d (i.e., compression level) at the current load (L) may equal Min{Pc(Uc(L,d))+Ps(Us(L,d))} where "Pc(Uc(L,d))" is the cost function for the CPU usage and "Ps(Us(L,d))" is the cost function for I/O usage, and where the identifying 312 may scan all possible d values to determine the optimal d value (e.g., resulting in the minimum combined cost of overall resource usage). After determination or identification of the optimal compression level, such as by selector 162 of FIGS. 2 and 3, the selector 162 may send 316 the identified or optimal compression level to the compression engine 124 for implementation. Thereafter, the compression engine may begin compressing incoming message copies at the optimal compression level (e.g., where the message service provider 104 is receiving messages at a messaging load (L) equal or substantially equal to the messaging load (L) used in the obtaining 304, predicting 308 and identifying 312 steps.

It is noted that in the absence of historical data (e.g., the various historical messaging state data collections $166_{1-n}$ in FIG. 3), such as upon initiation of the method 300, compression levels (e.g., compression levels 176) for which resource usage is to be predicted (predicted resource usage levels 178) may need to be at least partially arbitrarily determined. For instance, if a particular compression algorithm supports five compression levels, levels 2, 3 and 4 may be initially chosen as "Compression Level$_1$," "Compression Level$_2$," and "Compression Level$_3$" (e.g., see FIG. 3, "Compression Level$_3$ not being shown) for which resource usage is to be predicted and from which a next optimal compression level may be chosen. As more and more historical data (e.g., base data points) becomes available, the method 300 may be able to more accurately predict resource usage levels and optimal compression levels.

It will be readily appreciated that many deviations may be made from the specific embodiments disclosed in the specification without departing from the spirit and scope of the invention. As discussed previously, a single pricing may be utilized for network bandwidth and storage resources (e.g., to simplify the prediction and identification processes). However, other embodiments envision that network bandwidth and storage resources may be separately considered, such as in the case where network bandwidth and storage resources have different pricing/cost packages. For instance, the obtaining step 304 may include obtaining Uc (for CPU usage), Us (for storage), and Un (for network bandwidth usage), where each of Uc, Us and Un is separately recorded in the vector for each respective messaging state data collection 166 in FIG. 3. Thereafter, the predicting step 308 may include predicting each of Uc(L,d), Us(L,d), and Un(L,d) for each of a plurality of compression levels at the current L. The optimal d at the current L in the identifying step 312 may then equal Min{Pc (Uc(L,d))+Ps(Us(L,d))+Pn(Un(L,d))} where "Pc(Uc(L,d))"

is the cost function for the CPU usage, "Ps(Us(L,d))" is the cost function for storage usage, and "Pn(Un(L,d))" is the cost function for network bandwidth usage.

As also discussed herein, the particular compression technique or algorithm implemented by the compression engine 124 may be identified or chosen (e.g., in addition to or as an alternative to an identified compression level) to reduce overall resource usage levels and/or costs. For instance, performance data (e.g., Uc(L,d) and Us(L,d)) may be predicted for all of a plurality of compression algorithms (e.g., gzip, LZF, WinZip, etc.) which may be utilized to select a particular one of the compression techniques. In one arrangement, each compression algorithm may be applied for a short period of time to obtain base data points (and the particular compression technique being utilized would be recorded). Subsequently, a linear regression model may be utilized for each of the compression techniques to predict resource usage levels for each of a number of compression levels for a common messaging load. In the identifying step 312, all compression techniques may be considered to identify an optimal combination of compression technique and compression level (d) which results in a minimized Pc+Ps or Pc+Ps+Pn.

In a further arrangement, "weighted linear regression" may be utilized to predict resource usage levels at various compression levels for a common messaging load (e.g., to account for some data points weighing differently than other data points). For instance, when estimating the Uc(L=5,d=23) in FIG. 6, the data point of (L=5,d=22) may be significantly heavier than another data point of (L=15,d=50). In one arrangement, the inverse of the distance between the known data point and the yet-to-estimate data point may be used to determine the weight value to be afforded the known data point.

In addition to minimizing or at least reducing the charging incurred by the messaging customers, the cloud provider (e.g., the messaging service provider 104) can also benefit from the disclosed utilities in a number of manners. In one regard, by providing such "self-adapting" utilities, its cloud products (e.g., cloud messaging services) could better attract customers. In another regard, the disclosed utilities could be employed by the cloud provider to reduce equipment and/or operational costs. As an example, as CPU and storage/networking resources may be associated with different costs or cost structures, a cloud provider can apply the disclosed utilities to minimize the equipment/operational cost while supporting a particularly defined level of service. For instance, by self-tuning the compression (e.g., the compression level and/or compression technique/algorithm), the cloud provider could trade more expensive resources for less expensive resources while maintaining the same service level.

It is to be understood that the functionalities performed by many of the processes and modules discussed herein may be performed by other modules, devices, processes, etc. The illustrations and discussion herein has only been provided to assist the reader in understanding the various aspects of the present disclosure. Embodiments disclosed herein can be implemented as one or more computer program products, i.e., one or more modules of computer program instructions encoded on a computer-readable medium for execution by, or to control the operation of, data processing apparatus. For example, the various components of the message service provider 104 (e.g., analysis module 150, compression engine 124, etc.) may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The cloud-based messaging environment 100 may encompass one or more apparatuses, devices, and machines for processing data, including by way of example a programmable processor, a computer, or multiple processors or computers. In addition to hardware, the cloud-based messaging environment 100 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (e.g., the dynamic consumption cost determination and associated resource scheduling disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

In different embodiments, cloud-based messaging environment 100 (e.g., message service provider 104, storage server 130, clients on which message producers and consumers 108, 112 are run or executed) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method, comprising:
    obtaining, over time, by a messaging service provider that facilitates the transmission of messages between message producers and message consumers, respective data collections representing a plurality of messaging states, wherein each messaging state data collection includes a messaging load of messages being received at the message service provider, a level of compression of the received messages by the messaging service provider at the messaging load, and one or more usage levels of a plurality of different resources being consumed as a function of the messaging load and messaging compression level;
    storing the obtained messaging state data collections in a storage accessible by the messaging service provider;
    estimating, from the obtained messaging state data collections, resource usage levels of the plurality of resources at a plurality of different messaging compression levels based on a common messaging load, wherein each resource of the plurality of resources is associated with a respective cost function for usage of the resource;
    selecting, based on the estimated resource usage levels and the respective cost functions, a particular messaging compression level from the plurality of different messaging compression levels to achieve a desired overall cost for use of the plurality of resources; and
    compressing copies of messages received at the messaging service provider under the common messaging load at the particular messaging compression level.

2. The method of claim 1, wherein the plurality of resources includes at least two selected from the group consisting of processing, storage, and networking.

3. The method of claim 2, wherein the resource usage levels of the storage and networking are collectively considered during the obtaining step, estimating step and selecting step.

4. The method of claim 1, wherein the storing step comprises:
    storing each messaging state data collection in a respective record of a vector, wherein the estimating step utilizes at least some of the records.

5. The method of claim 4, wherein the at least some of the records are more recent to a current time than are other of the records.

6. The method of claim 1, wherein the collected messaging state data collections include a plurality of data points, and wherein the estimating step comprises:
    performing a linear regression on the plurality of data points to predict resource usage levels of the plurality of resources at the plurality of different messaging compression levels based on the common messaging load.

7. The method of claim 6, wherein data points of the plurality of data points associated with messaging loads and compression levels that are closer to a particular messaging load and compression level under consideration in the estimating than are messaging loads and compression levels of other data points of the plurality of data points are weighted more heavily in the linear regression than are the other data points of the plurality of data points.

8. The method of claim 1, further comprising:
    queuing the messages in a memory of the messaging service provider before the compressing step.

9. The method of claim 8, further comprising:
    sending the compressed copies of the queued messages to a storage server over at least one network after the compressing step.

10. The method of claim 1, wherein each compression level comprises a percentage reduction in size of each received message copy.

11. The method of claim 1, wherein each compression level comprises a percentage of all received message copies to be compressed.

12. An adaptive message compression system for a message service provider in a cloud-computing environment, comprising:
    a processor; and
    a memory in communication with the processor and having a queue that stores messages received from a message producer over at least one network for retrieval by a message consumer over at least one network, wherein the memory further includes:

a compression engine including computer-readable instructions that are executable by the processor to compress copies of the queued messages at one or more compression levels, the compressed message copies being transmitted to a storage server over at least one network for storage, wherein compression and transmission of the of the queued message copies to the storage server consumes processing, network bandwidth and storage resources of the adaptive message compression system; and an analysis module including computer-readable instructions that are executable by the processor to determine at least one particular compression level that reduces collective costs associated with consumption of the processing, network bandwidth and storage resources of the adaptive message compression system, wherein the particular compression level is implemented by the compression module, and wherein the analysis module includes:

a collection module including computer-readable instructions that are executable by the processor to record a messaging load, a messaging compression level, and usage levels of the processing, network bandwidth and storage resources after each of a plurality of different time periods;

an estimation module including computer-readable instructions that are executable by the processor to predict usage levels of the processing, network bandwidth and storage resources for each of a plurality of different compression levels based on a common messaging load; and a selection module including computer-readable instructions that are executable by the processor to identify the particular compression level from the plurality of different compression levels.

13. The adaptive message compression system of claim 12, wherein the estimation module incorporates a least-squares fitting to solve a linear regression model.

14. The adaptive message compression system of claim 12, further comprising:

a triggering module including computer-readable instructions that are executable by the processor to detect when a message has been retrieved from the queue by a message consumer and, in response, triggers the storage server to delete the compressed copy of the message stored in the storage server.

15. The adaptive message compression system of claim 12, wherein each compression level comprises a percentage reduction in size of each received message and/or a percentage of all received messages to be compressed.

16. The adaptive message compression system of claim 12, wherein the compression engine compresses the copies of the queued messages at the one or more compression levels using one of a plurality of compression techniques, and wherein the analysis module selects the one of the compression techniques so as to reduce collective costs associated with consumption of the processing, network bandwidth and storage resources of the adaptive message compression system.

17. A cloud-based computing system, comprising:

a processor; and a non-transitory computer-readable memory logically connected to the processor and comprising a set of computer readable instructions executable by the processor to:

receive messages from message producers over one or more networks at one or more messaging loads;

store the messages in the memory, the messages intended for retrieval by message consumers over one or more networks;

determine at least one particular compression level at which to compress copies of the messages to be sent for storage on a network-based storage server, the particular compression level being a compression level that reduces overall costs associated with consumption of processing, network bandwidth and storage resources of the system in conjunction with compression and storage of messages, wherein the computer readable instructions are executable by the processor to determine by way of:

recording a messaging load, a messaging compression level, and usage levels of the processing, network bandwidth and storage resources after each of a plurality of different time periods;

predicting usage levels of the processing, network bandwidth and storage resources for each of a plurality of different compression levels based on a common messaging load; and identifying the particular compression level from the plurality of different compression levels;

compress copies of the stored messages at the particular compression level; and send the compressed message copies to a network-based storage server for storage.

* * * * *

UNITED STATES PATENT AND TRADEMARK OFFICE
CERTIFICATE OF CORRECTION

PATENT NO.         : 9,270,624 B2
APPLICATION NO.    : 13/891981
DATED              : February 23, 2016
INVENTOR(S)        : Zhuang et al.

It is certified that error appears in the above-identified patent and that said Letters Patent is hereby corrected as shown below:

Specification

In column 4, line 52, delete "of the of the" and insert -- of the --, therefor.

Claims

In column 17, line 7, in claim 12, delete "of the of the" and insert -- of the --, therefor.

Signed and Sealed this
Fourth Day of October, 2016

Michelle K. Lee
*Director of the United States Patent and Trademark Office*